(12) United States Patent
Miller et al.

(10) Patent No.: US 8,038,371 B2
(45) Date of Patent: *Oct. 18, 2011

(54) PUSH BUTTON HOLESAW MANDREL ASSEMBLY

(75) Inventors: Mark D. Miller, Airville, PA (US); Mark E. Brunson, Bel Air, MD (US); Rickey J. Thomas, Lineboro, MD (US)

(73) Assignee: Black & Decker Inc., Newark, DE (US)

( * ) Notice: Subject to any disclaimer, the term of this patent is extended or adjusted under 35 U.S.C. 154(b) by 1205 days.

This patent is subject to a terminal disclaimer.

(21) Appl. No.: 11/787,267

(22) Filed: Apr. 13, 2007

(65) Prior Publication Data

US 2008/0253851 A1    Oct. 16, 2008

(51) Int. Cl.
   *B23B 51/04*    (2006.01)
(52) U.S. Cl. .............. 408/204; 408/239 R; 403/348
(58) Field of Classification Search .......... 408/204–209, 408/139, 140, 239 R; 279/7, 8, 141; 192/93 C, 192/54.52; 403/348, 349; *B23B 51/04*
See application file for complete search history.

(56) References Cited

U.S. PATENT DOCUMENTS

| | | | |
|---|---|---|---|
| 2,435,648 A | 2/1948 | Frevel | |
| 2,778,091 A * | 1/1957 | St Palley | 408/231 |
| 2,779,361 A * | 1/1957 | McKiff | 408/204 |
| 2,917,975 A * | 12/1959 | Webster | 407/48 |
| 3,220,449 A | 11/1965 | Franklin | |
| 3,267,975 A | 8/1966 | Enders | |
| 3,293,740 A | 12/1966 | Enders | |
| 3,360,025 A | 12/1967 | Gallo, Sr. | |
| 3,758,221 A | 9/1973 | Meshulam | |
| 3,784,316 A | 1/1974 | Bittern | |
| 3,825,362 A * | 7/1974 | Hougen | 408/68 |
| 3,837,759 A | 9/1974 | Bittern | |
| 3,880,546 A | 4/1975 | Segal | |
| 3,970,407 A | 7/1976 | Uffman | |
| 3,973,862 A * | 8/1976 | Segal | 408/204 |
| 4,036,560 A | 7/1977 | Clark et al. | |
| 4,072,441 A | 2/1978 | LaPointe | |
| 4,077,737 A | 3/1978 | Morse | |
| 4,303,357 A | 12/1981 | Makar | |
| 4,422,811 A | 12/1983 | Ellison et al. | |
| 4,490,080 A | 12/1984 | Kezran | |
| 4,588,335 A | 5/1986 | Pearson, Jr. | |
| 4,669,928 A | 6/1987 | Mediavilla | |

(Continued)

FOREIGN PATENT DOCUMENTS

EP    0 958 083    9/2001

(Continued)

*Primary Examiner* — Eric A Gates

(74) *Attorney, Agent, or Firm* — Harness, Dickey & Pierce, P.L.C.

(57) ABSTRACT

A holesaw mandrel assembly has a mandrel body with a first end to be coupled with a drill motor and a second end extending from the body. The second end receives a holesaw. The first member is positioned on the second end. The first member is axially movable on the second end. A friction surface is on the first member. The friction surface is adapted to contact a base surface of the holesaw such that upon contact with the friction surface, the holesaw is fixed in position. The friction surface moves between a first contact position and a second release position. A mechanism on the first member moves the friction surface between the first and second position.

15 Claims, 3 Drawing Sheets

U.S. PATENT DOCUMENTS

| | | | | |
|---|---|---|---|---|
| 4,741,651 | A | 5/1988 | Despres | |
| 4,755,087 | A | 7/1988 | Parent | |
| 4,929,128 | A * | 5/1990 | Affleck | 408/139 |
| 4,968,189 | A | 11/1990 | Pidgeon | |
| 5,035,548 | A | 7/1991 | Pidgeon | |
| 5,061,126 | A | 10/1991 | Cain et al. | |
| 5,076,741 | A | 12/1991 | Littlehorn | |
| 5,096,341 | A * | 3/1992 | Despres | 408/68 |
| 5,108,235 | A | 4/1992 | Czyzewski | |
| 5,154,552 | A | 10/1992 | Koetsch | |
| 5,171,111 | A | 12/1992 | Kishimoto | |
| 5,175,963 | A * | 1/1993 | Schafer et al. | 451/342 |
| 5,226,762 | A | 7/1993 | Ecker | |
| 5,246,317 | A | 9/1993 | Koetsch et al. | |
| 5,352,071 | A | 10/1994 | Cochran et al. | |
| 5,429,457 | A * | 7/1995 | Asano et al. | 408/204 |
| 5,435,672 | A * | 7/1995 | Hall et al. | 408/68 |
| 5,597,274 | A | 1/1997 | Behner | |
| 5,624,213 | A * | 4/1997 | Anderson | 408/206 |
| 5,639,193 | A * | 6/1997 | Anderson | 408/204 |
| 5,658,102 | A | 8/1997 | Gale | |
| 5,690,452 | A | 11/1997 | Baublits | |
| 5,868,532 | A | 2/1999 | Spenser | |
| 5,957,636 | A | 9/1999 | Boisvert | |
| 5,967,709 | A | 10/1999 | Thuesen | |
| 6,120,221 | A | 9/2000 | Alm | |
| 6,341,925 | B1 | 1/2002 | Despres | |
| 6,357,973 | B2 | 3/2002 | Chao | |
| 6,379,089 | B1 | 4/2002 | Sugiura et al. | |
| 6,409,436 | B1 | 6/2002 | Despres | |
| 6,554,292 | B1 | 4/2003 | Rohm | |
| 6,604,744 | B2 | 8/2003 | Monge | |
| 6,623,220 | B2 | 9/2003 | Nuss et al. | |
| 6,641,338 | B2 | 11/2003 | Despres | |
| 6,705,807 | B1 | 3/2004 | Rudolph et al. | |
| 6,851,678 | B2 | 2/2005 | Mack | |
| 6,887,018 | B2 * | 5/2005 | Ostermeier | 408/204 |
| 7,001,116 | B2 * | 2/2006 | Kozak | 408/68 |
| 7,073,992 | B2 | 7/2006 | Korb et al. | |
| 7,097,397 | B2 | 8/2006 | Keightley | |
| 7,101,124 | B2 | 9/2006 | Keightly | |
| 7,104,738 | B2 | 9/2006 | Cantlon | |
| 7,112,016 | B2 | 9/2006 | Nordlin | |
| 7,163,362 | B2 | 1/2007 | Keightly | |
| 7,488,146 | B2 * | 2/2009 | Brunson | 408/204 |
| 7,517,179 | B2 * | 4/2009 | Miller et al. | 408/204 |
| 2002/0122703 | A1 | 9/2002 | Czyzewski et al. | |
| 2005/0025591 | A1* | 2/2005 | Korb et al. | 408/204 |
| 2006/0088393 | A1 | 4/2006 | Cooper | |
| 2010/0239381 | A1* | 9/2010 | Kelleher | 408/204 |

FOREIGN PATENT DOCUMENTS

| | | |
|---|---|---|
| EP | 0 951 375 | 4/2002 |
| EP | 1 193 014 | 7/2004 |
| EP | 1 462 198 | 9/2004 |
| EP | 1 555 076 | 7/2005 |
| GB | 2 257 381 | 1/1993 |
| WO | WO 97/15413 | 5/1997 |
| WO | WO 2004/011179 | 2/2004 |
| WO | WO 2004/085104 | 10/2004 |
| WO | WO 2005/000506 | 1/2005 |
| WO | WO 2005/120754 | 12/2005 |
| WO | WO 2006/122417 | 11/2006 |

* cited by examiner

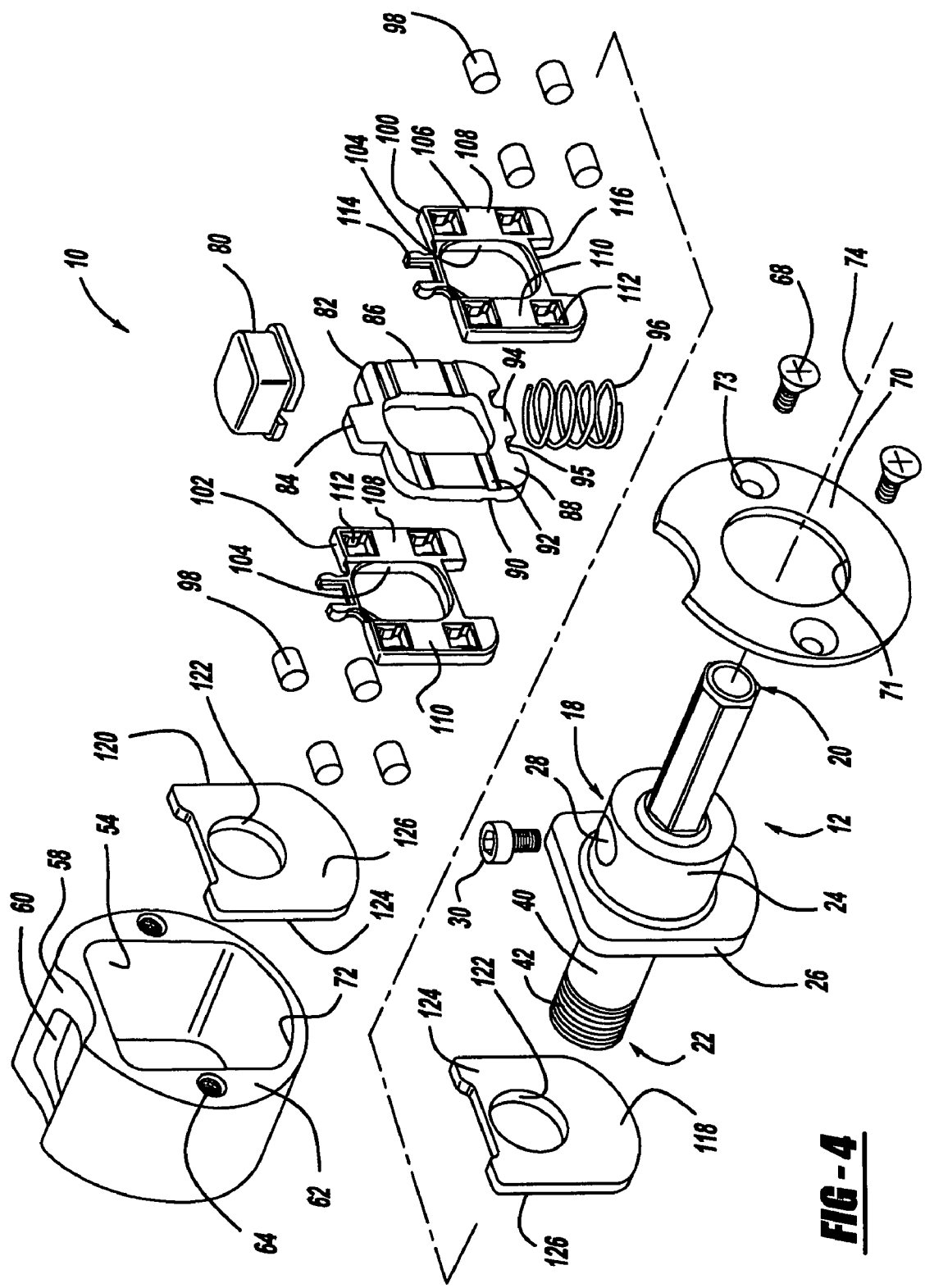

PUSH BUTTON HOLESAW MANDREL ASSEMBLY

FIELD

The present disclosure relates to holesaws and, more particularly, to a mandrel assembly which receives holesaws.

BACKGROUND

Various types of holesaw mandrel assemblies exist in the art. The assemblies are concerned with a quick release device in order to readily remove the holesaw from the mandrel assembly after use. Various types of mechanisms have been utilized in order to secure the holesaw onto the mandrel assembly, all of which enable the holesaw to be removed. Some of these mandrel assemblies utilize pins or the like which fit into the base of the holesaw. The pins hold the holesaw in position during rotation and cutting. However, since the holesaw is not torque down onto the collar adjacent the threaded spud, the pins can be removed from the base of the holesaw and the holesaw can be easily rotated and removed from the threaded spud.

When smaller diameter holesaws are utilized, the base of the holesaw does not include holes to receive the pins on the mandrel assemblies. This is due to the fact that the diameter of the base is too small to register with the pins. Also, during use, due to the threaded engagement of the spud with the small holesaw, the holesaw is torqued down onto the collar of the mandrel assembly. Accordingly, a wrench or the like is required to loosen the holesaw from the mandrel collar in order to remove the holesaw from the mandrel assembly. The art does not provide a small holesaw mandrel which enables the user to quickly remove, by hand, the holesaw from the mandrel assembly. Thus, it is desirable to have a mandrel assembly which enables the quick release of small diameter holesaws.

SUMMARY

The present disclosure provides the art with a holesaw mandrel assembly which enables a quick release of holesaws from the mandrel assembly. The present holesaw mandrel assembly provides a friction face that abuts the holesaw. The friction face axially moves away from the holesaw into a release position. The holesaw assembly enables the friction face to move automatically back to its original position. The holesaw mandrel assembly provides a push button action to enable the axial movement of the friction face.

According to a first aspect of the disclosure, a holesaw mandrel assembly comprises a mandrel having a body with a first end to couple with a drill motor. A second end extends from the body. The second end includes a thread to receive a holesaw. A first member is positioned on the second end. The first member axially moves on the second end. A friction surface is on the first member. The friction surface is adapted to contact or engage a base surface of the holesaw such that upon contact with the friction surface, the holesaw is fixed in position. The friction surface moves between a first contact and second release position. A mechanism, on the first member, moves the friction surface between the first and second positions. The mechanism is biased to return the first member to its first position from its second or released position. The mechanism includes a second member movable transverse to the mandrel axis to enable the axial movement of the first member. At least one roller is positioned between the first and second member. The second member includes a body including at least one recess to receive the at least one roller. The mechanism includes at least one cage to retain the at least one roller.

According to a second aspect of the disclosure, a holesaw mandrel assembly comprises a mandrel which includes a body with a first end to couple with a drill motor. A second end extends from the body. The second end includes a thread to receive a holesaw. A first member is on the second end. The first member axially moves on the second end. A push button mechanism is coupled with the first member. At least one roller is associated with the push button mechanism. The at least one roller is in contact with the push button member. The push button member moves between a first and a second position to enable the first member to move axially along the second end. When the push button mechanism is in its first position, the first member is fixed so that a holesaw may be screwed onto the thread and abuts the first member to secure a holesaw in a use position on the first member. When the push button mechanism is moved to its second position, the first member moves axially away from the holesaw to enable the holesaw to be easily removed from the thread. The push button mechanism includes at least one recess which is adjacent to the at least one roller. When the push button mechanism is in its second position, the at least one roller is positioned in the at least one recess. A plurality of rollers is present with at least two rollers sandwiching the push button mechanism. A pair of friction plates are positioned such that the at least two roller each contact one of the pair of friction plates. A biasing member moves the push button mechanism between the first and second positions.

According to a third aspect of the disclosure, a holesaw mandrel assembly comprises a mandrel with a body which includes a first end to couple with a drill motor. A second end extends from the body. The second end includes a thread to receive a holesaw. A first member is on the second end. The first member axially moves on the second end. A friction surface is on the first member. The friction surface is adapted to contact the base surface of the holesaw such that upon contact with the friction surface, the holesaw is fixed in position. The friction surface moves between a first contact and a second release position. A mechanism is coupled with the first member to move the friction surface between the first and second positions. The mechanism comprises a push button member extending through the first member. The push button member includes a body member with two side faces with a plurality of recesses on each side face. A plurality of rollers, equal in number to the plurality of recesses, is positioned on the two sides of the body member. The plurality of rollers is positioned adjacent to the plurality of recesses. When the plurality of rollers is on the side faces, the first member is in its first position. When the rollers are in the recesses, the first member is in the second position. The push button member moves between the first and second positions, via a spring, wherein the plurality of rollers move in and out of the adjacent recesses. A pair or cages retain the roller in position. A pair of friction members are positioned adjacent the rollers. One friction member is on each side of the push button member and in contact with the rollers.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is an exploded perspective view of the mandrel of FIG. 1.

DETAILED DESCRIPTION

Figure 1:
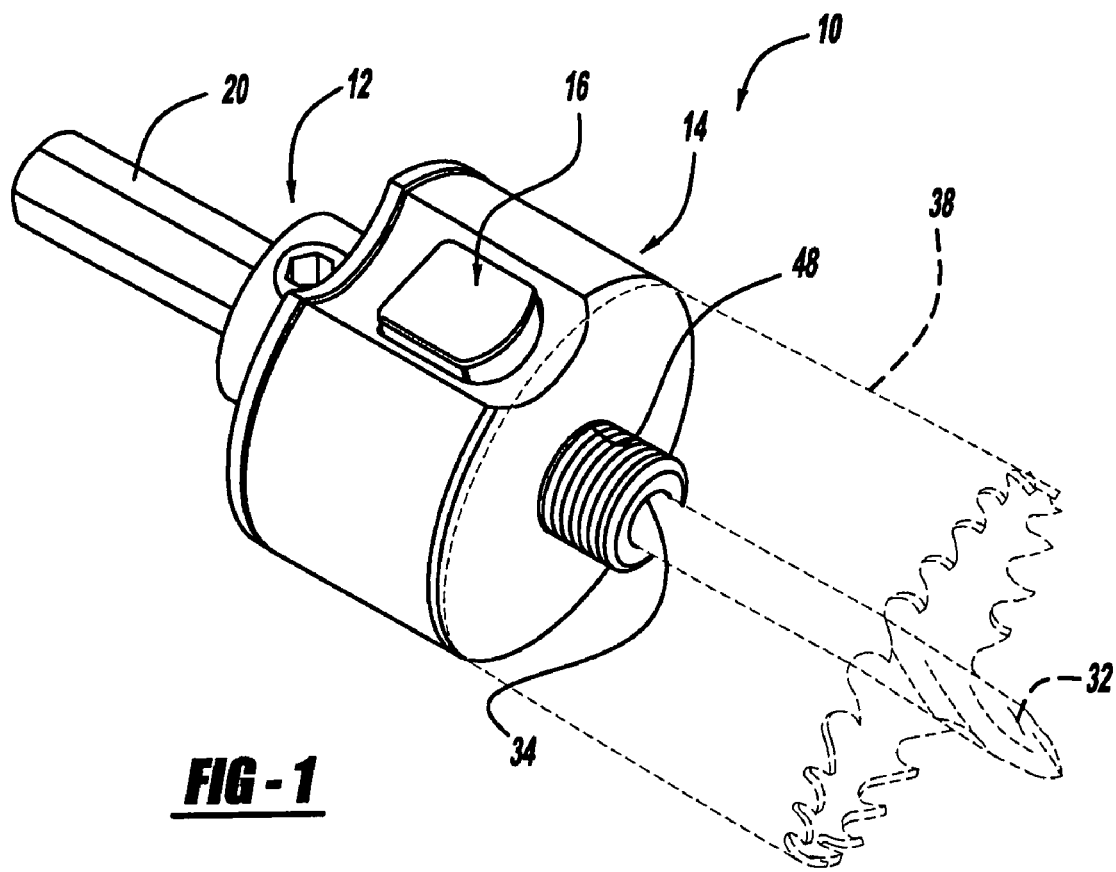
FIG. 1 is a perspective view of a holesaw mandrel.

The following description is merely exemplary in nature and is not intended to limit the present disclosure, application, or uses.

Turning to the figures, a holesaw mandrel is illustrated and designated with the reference numeral 10. The mandrel assembly 10 includes a mandrel 12, a first movable member 14, and a mechanism 16 for moving the first member 14 between a first and second position. The mandrel 12 includes a body 18 with a first projecting end 20 and a second extending end 22. The first projecting end 20 is cylindrical and may have an outer polygonal surface to connect the mandrel 12 with a rotating tool, such as a drill. The body 18 has a first cylindrical portion 24 and a larger plate portion 26. The first portion 24 includes an aperture 28 to receive a fastener 30 which retains a pilot drill bit 32 in a bore 34. The pilot drill bit 32 extends through the second extending member 22. The second plate 26 has an overall elongated D-shape and includes a flat receiving surface 36.

The second extending end 22 of the mandrel 12 includes a first cylindrical portion 40 and a threaded spud 42. The threaded spud 42 receives a holesaw 38 in a conventional manner. The first cylindrical portion 40 extends from the larger second plate portion 26.

Figure 2:
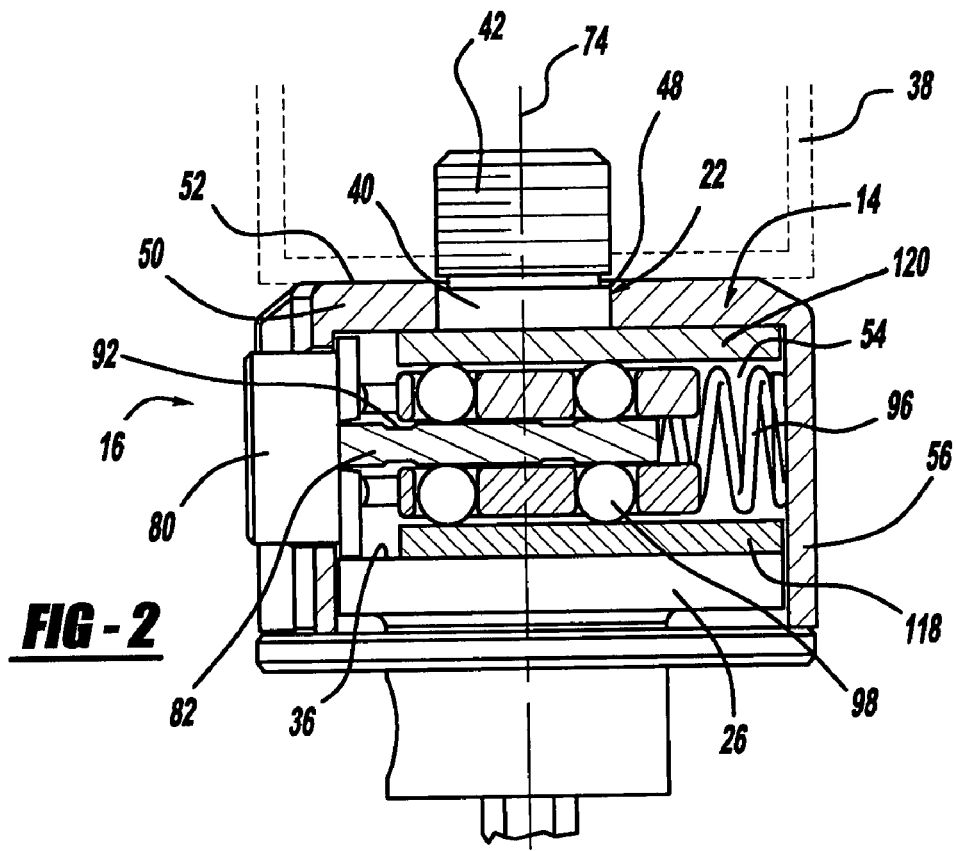
FIG. 2 is a cross section view of the mandrel of FIG. 1 in a first position.

The first member 14 has an overall cup shaped configuration. The first member includes a bore 48 through the base portion 50 of the cup shaped first member 14. The base portion 50 includes a friction face 52 which receives the base of the holesaw 38 as seen in FIG. 2. The bore 48 enables the first member 14 to be positioned on the second end 22 of the mandrel 12. The bore 48 opens into a larger cylindrical open space 54 inside the cylindrical wall 56 of the cup shaped first member 14. The wall 56 includes an arcuate cut-out portion 58 as well as a bore 60 which receives a portion of the moving mechanism 16. A back plate 62 is connected with the wall 56. The back plate 62 is substantially parallel to the base portion 50. The back plate 62 includes a pair of apertures 64 which receive fasteners 68 to retain a securement plate 70 onto the first member 14. The securement plate 70 includes an aperture 71 to receive the mandrel cylindrical portion 24 as well as a pair of apertures 73 to receive fasteners 68. The back plate 62 includes a cut-out 72, having an overall elongated D-shape, to receive the moving mechanism 16 and the mandrel plate portion 26.

The mechanism 16, which moves the first member 14 between a first and second position, is positioned transverse to the longitudinal axis 74 of the mandrel 12. The mechanism 16 includes a push button 80 which is positioned in the aperture 60. The push button 80, through its movement which will be explained later, enables the axial movement of the first member 14 on the mandrel 12. The push button 80 is coupled with or unitarily formed with a plate member 82. The plate member 82 includes a projection 84 which seats inside of the push button 80. The plate member 82 has an overall rectangular annular shape with an elongated elliptical opening 86 in the middle of the plate member 82. The elliptical opening 86 receives the mandrel second end 22. The plate member 82 includes a pair of side faces 88 and 90. The side faces 88 and 90 each include at least one and preferably a plurality of recesses 92. Also, the plate member 82 includes a tail 94 and recess 95 which are associated with the biasing spring 96. The spring 96 biases the push button 80 between its first and second positions.

Figure 3:
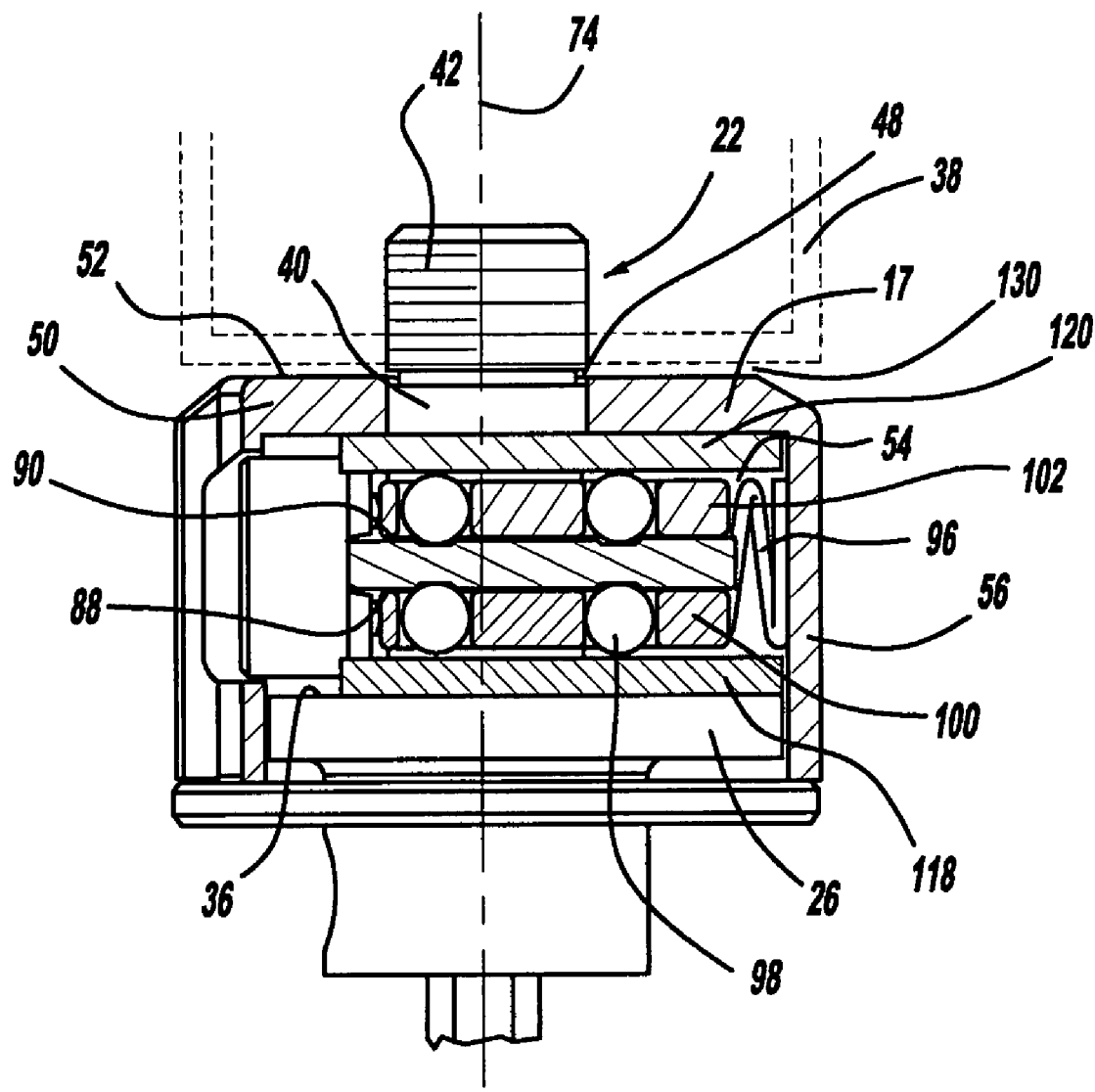
FIG. 3 is a view like FIG. 2 in a second position.

At least one and preferably a plurality of rollers 98 are positioned on each side face 88 and 90 of the plate member 82. The rollers 98, when the push button 80 is in a first position as seen in FIG. 2, rest on the planar side faces 88, 90 of the plate member 82. In the push button 80 second position as seen in FIG. 3, the rollers move from the planar side faces 88, 90 into the recesses 92.

A pair of cages 100 and 102 holds the rollers 98 in position. The cages 100 and 102 are identical and the disclosure of one equally applies to the other. The cages 100, 102 have an overall rectangular shape with an elliptical aperture 104, to receive the mandrel second end 22, in the middle of the body 106. The body 106 has two sides 108 and 110, each of which includes at least one, and shown with a pair of apertures 112. The apertures 112 receive the rollers 98 in the cages 100 and 102. A projecting member 114 extends from the body 106 into the push button member 80. Also, a cut out 116 is opposite the projecting member 114 to enable the biasing spring 96 to seat in the cut out portion 116.

A pair of friction plates 118 and 120 sandwiches the rollers and cages against the plate 82. The friction plates 118 and 120 are substantially identical and the explanation with respect to one applies to both. The friction plates 118 have an overall D shape with a circular aperture 122. The aperture 122 is circular and sized to fit onto the second extending member 22 of the mandrel 12. Thus, unlike the plate 82 and cages 100, 102, the friction plates 118, 120 are unable to move laterally with respect to the extending member 22. The friction plates 118 and 120 have flat planar surfaces 124 and 126. The flat planar surfaces 124, 126 provide a rolling surface for the rollers 98. One of the flat planar surfaces of the plate 118 abuts the flat surface 36 of the second plate member 26 of the mandrel 12 while the other abuts the flat inside surface of base 50. It should be noted that the friction plates may be removed and the flat surface 36 and inside surface of the base 50 may be used as the rolling surfaces for the rollers 98.

The friction plates 118 and 120 as well as cages 100 and 102 with rollers 98 sandwiching plate 82 are all positioned onto the extending member 22 of the mandrel 12. This is best illustrated in FIGS. 2 and 3. The biasing spring 96 abuts one side of the wall 56 opposite to the aperture 60. The push button 80 projects from the aperture 60 in the arcuate cut out portion 58. The plate 70 and the screw 68 retain the mandrel 12 in an assembled position with the first member 14 and the moving mechanism 16, positioned inside of the first member 14, on the mandrel 12.

A holesaw 38 is screwed onto spud 42 until it abuts the friction surface 52 of the first member 14 (see FIG. 2). At this time, the holesaw 38 is in a use position abutting the friction surface 52 which receives the force from the holesaw 38 torque during operation. Once the holesaw 38 is used to drill a hole and a different holesaw is desired, the holesaw 38 is removed from the mandrel. In order to do this, push button 80 is moved inward tranversed to the longitudinal axis 74 of the mandrel 12. As this occurs, plate 82 is moved laterally against the spring 96. As the plate 82 continues to move, the cages 100 and 102 move laterally half the distance of the plate 82. As the button 80 is fully depressed (see FIG. 3), the rollers 98 fall into the recesses 92 in the plate 82. As this happens, due to the force on the friction surface 52 of the first member 14 as well as the space created by the recesses 92, the first member 14 moves away from a holesaw 38 as seen in FIG. 3. A gap 130 is created between the holesaw 38 and the friction surface 52 of the first member 14. This enables the user to easily remove the holesaw 38 from the threaded spud 42. Once the force is removed from the push button 80, the spring 96 returns the push button 80, as well as the plate 82 and cages 100, 102, to their original position. Since the spring 96 is able to move the plate 82 as well as the cages 100, 102, it enables the cages 100, 102 and plate 82 to align and register with one another so that the rollers 98 are in a proper first position with respect to the recesses 92 as shown in FIG. 2. Thus, the mandrel assembly 10 is ready for its next use.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A holesaw mandrel assembly comprising:
   a mandrel having a body with a first end for coupling with a drill motor, a second end extending from said body, said second end including a mechanism for receiving a holesaw;
   a first member on said second end, said first member axially movable on said second end;
   a friction surface on said first member, said friction surface adapted for contacting a base surface on the holesaw such that upon contact with said friction surface, the holesaw is in a fixed position, said friction surface moving between a first contact and a second release position; and
   a mechanism on said first member for moving said friction surface between said first and second positions, said mechanism having a portion positioned externally on said first member.

2. The mandrel assembly according to claim 1, wherein said mechanism on said first member is biased between its first position from its second position.

3. The mandrel assembly according to claim 1, wherein said mechanism on said first member further comprises a second plate member movable transverse to the mandrel axis for enabling axial movement of said first member.

4. The mandrel assembly according to claim 3, further comprising at least one roller positioned between said first member and second plate member.

5. The mandrel assembly according to claim 4, wherein said second plate member includes a body including a flat surface with at least one recess for receiving said at least one roller.

6. The mandrel assembly according to claim 4, wherein said mechanism on said first member includes at least one cage for positioning said at least one roller.

7. A holesaw mandrel assembly comprising:
   a mandrel having a body with a first end for coupling with a drill motor, a second end extending from said body, said second end including a mechanism for receiving a holesaw;
   a first member on said second end, said first member axially movable on said second end;
   a push button mechanism on said first member;
   at least one roller associated with said first member and said push button mechanism, said at least one roller in contact with said push button member, said push button mechanism moving between a first and a second position for enabling said first member to move axially along said second end, wherein when said push button mechanism is in its first position, said first member is fixed so that a holesaw may be screwed onto said receiving mechanism and abut said first member securing said holesaw in a use position on said first member and when said push button mechanism is moved into its second position, said first member moves axially away from the holesaw enabling said the holesaw to be easily removed from said receiving mechanism.

8. The holesaw mandrel assembly according to claim 7, further comprising at least one recess in said push button mechanism, said recess adjacent said at least one roller.

9. The holesaw mandrel assembly according to claim 7, wherein when said push button is in its second position said at least one roller is positioned in said at least one recess.

10. The holesaw mandrel assembly according to claim 9, further comprising a pair of friction plates, said at least two rollers each contacting one of said pair of friction plates.

11. The holesaw mandrel assembly according to claim 10, further comprising a biasing member for moving said push button mechanism between said second and first positions.

12. The holesaw mandrel assembly according to claim 7, further comprising a plurality of rollers, at least two rollers of said plurality of rollers sandwiching said push button mechanism.

13. A holesaw mandrel assembly comprising:
   a mandrel having a body with a first end for coupling with a drill motor, a second end extending from said body, said second end including a mechanism for receiving a holesaw;
   a first member on said second end, said first member axially movable on said second end;
   a friction surface on said first member, said friction surface adapted for contacting a base surface on the holesaw such that upon contact with said friction surface, the holesaw is fixed in position, said friction surface moving between a first contact and a second release position; and
   a mechanism on said first member for moving said friction surface between said first and second positions, said mechanism comprising a push button member extending through said first member, said push button member including a body member with two side faces with a plurality of recesses on each side face, a plurality of rollers equal in number to said plurality of recesses, said plurality of rollers positioned on each of said side faces adjacent said plurality of recesses, when said plurality of rollers are on said side faces, said first member is in said first position and when said plurality of rollers are in said plurality of recess, said first member is in said second position, and said push button member moving between a first and second position wherein said plurality of rollers are moved in and out of said recesses.

14. The mandrel assembly of claim 13, further comprising a pair of cages, one cage on each side of said push button member.

15. The mandrel assembly of claim 13, further comprising a pair of friction members, one friction member on each side of said push button member in contact with said plurality of rollers.

* * * * *